United States Patent [19]

Okura

[11] Patent Number: 4,839,794

[45] Date of Patent: Jun. 13, 1989

[54] PSEUDO-STATUS SIGNAL GENERATOR

[75] Inventor: Makoto Okura, Kamakura, Japan

[73] Assignee: Mitsubishi Denki Kabushiki Kaisha, Japan

[21] Appl. No.: 122,131

[22] Filed: Nov. 18, 1987

Related U.S. Application Data

[63] Continuation-in-part of Ser. No. 50,392, May 18, 1987, abandoned.

[30] Foreign Application Priority Data

May 20, 1986 [JP] Japan .................................. 61-113641

[51] Int. Cl.⁴ ............................................. G06F 13/14
[52] U.S. Cl. ................................................. 364/200
[58] Field of Search ... 364/200 MS File, 900 MS File

[56] References Cited

U.S. PATENT DOCUMENTS

| | | | |
|---|---|---|---|
| 4,167,041 | 9/1979 | Curlander et al. | 364/900 |
| 4,495,574 | 1/1985 | Hofstetter | 364/200 |
| 4,524,417 | 6/1985 | Kimoto | 364/200 |
| 4,698,770 | 10/1987 | Rattan et al. | 364/900 |
| 4,723,205 | 2/1988 | Fukuda et al. | 364/200 |

Primary Examiner—David L. Clark
Attorney, Agent, or Firm—Leydig, Voit & Mayer

[57] ABSTRACT

An electronic data transfer apparatus comprises a main device connected to input and output data, an input/output requesting device connected to the main device for controlling data input and output operations, a data bus provided between the main device and the input/output requesting device to facilitate connection therebetween for transferring data, and a pseudo-status signal generator interposed between the main device and the input/output requesting device for alternately generating status signals representing ready and busy states of the main device in accordance with a status request from the input/output requesting device whereby data transfer speed therebetween is substantially improved.

3 Claims, 6 Drawing Sheets

PSEUDO-STATUS SIGNAL GENERATOR

This application is a continuation-in-part of U.S. patent application Ser. No. 050,392, filed May 18, 1987, and entitled "Pseudo-Status Signal Generator", now abandoned.

TECHNICAL FIELD

This invention relates to an electronic data transfer apparatus having a pseudo-status signal generator for an electronic circuit such as a CRT device in which data input and output are always enabled.

BACKGROUND ART

FIG. 1 is a block diagram showing an example of a conventional prior art arrangement of an electronic data transfer apparatus. In FIG. 1, numeral 1 denotes a main device, such as a CRT device, and numeral 2 denotes an input/output requesting device, such as an input/output controller. The main device 1 and the input/output requesting device are connected to each other through a data bus 3. The data bus 3 includes an input request signal line 3A for transmitting a data input request from the input/output requesting device 2 to the main device, an output request signal line 3B for transmitting a data output request, a status request signal line 3C for requesting status information, such as "busy" or "ready", from the main device 1, and data signal lines 3D for transmitting data between the two devices. The main device 1 may also contain a status signal generator (not shown) for indicating the actual status information to an external device.

In the prior art example, the input/output requesting device 2 applies predetermined requests through the input request signal line 3A, the output request signal lie 3B, and the status request signal line 3C in the data bus 3 to the main device 1 so as to input and output data to and from the main device 1 in response to the status of the main device 1. The input/output requesting device 2 must complete the input or output operation of the predetermined data within a period that the main device 1 is ready, i.e., within a period that the input or output operation is enabled. Thus, the input/output requesting device 2 generates a predetermined status request to thereby read corresponding status information from the main device 1 and inputs or outputs the predetermined data after confirming that the main device 1 has entered the ready period. However, according to this method, there is a possibility that the main device 1 might enter a busy period, i.e., a period where the data input or output operation is disabled while the predetermined data are transferred between the two devices, causing interference in the main device 1. From this, it is necessary for the input/output requesting device 2 to synchronize the transfer of input or output data with the start of the ready period of the main device 1 and to terminate the transfer when the main device 1 enters a busy period.

FIG. 2 is a detailed diagram of a prior art CRT main device. In FIG. 2, a synchronous signal generator 5 supplies a synchronous signal to the CRT 7 for enabling and disabling data display. The memory 6 includes a WRITE ENABLE port receiving the input request signal 3A to control data input and output at the I/O DATA port. When the input request signal 3A is valid, data are written into the memory 6. Otherwise, the data stored in the memory 6 are read out and displayed on the CRT 7 or output to the input/output requesting device 2. At the same time, a buffer 8 transfers data from the input/output requesting device 2 to the memory 6. When the output request signal 3B is valid, a buffer 9 transfers data in the memory 6 to the input/output requesting device 2 on the data signal lines 3D. When the status request signal 3C is valid, a buffer 10 transfers the synchronous signal as a status signal to the input/output requesting device 2 on the data signal lines 3D.

As can be seen, when both the input request signal 3A and the output request signal 3B are invalid, data are read from the I/O DATA port of the memory 6 and displayed on the CRT 7 in accordance with the synchronous signal from the synchronous signal generator 5. When the output request signal 3B is valid, data to be output to the input/output requesting device 2 are read out of the memory 6 at the same I/O DATA port instead of being displayed on the CRT 7 and the CRT display is subjected to undesirable interference. Furthermore, when the input request signal 3A is valid, data from the input/output requesting device 2 enters the I/O DATA port of the memory 6 to be stored, interferes with data to be displayed on the CRT 7, and causes undesirable interference in the main device 1. However, as shown in FIG. 3, since the synchronous signal generated by the synchronous signal generator 5 includes periods in which data will not be displayed, there is no interference to the CRT 7 when the input and output request signals 3A and 3B are valid during this nondisplay period. These non-display periods can be discerned if the synchronous signals are read out as the status signal. Accordingly, the input/output operation is operable only during the non-display periods.

The above-described CRT device is a representative example of the main device 1 in which the ready period is a blanking period corresponding to a period when data can be input and output and the busy period is a display period corresponding to a period when data are displayed on the CRT device. The length of the busy period is generally longer than that of the ready period, and, when data are input or output within the ready period, the data to be displayed.

Payed within the busy period are reliably supplied to the CRT device. However, if the data input or output are, for example, started at or near the end of the ready period, the period will shift to the busy period before the input or output operation is finished, and interference will be displayed on the screen of the CRT device.

The flow chart in FIG. 4 shown an example of an algorithm illustrating operating steps devised to eliminate the above drawback. When the input/output requesting device 2 determines that an input/output operation is to be performed, it sends a status request to the main device 1, and the status signal of the main device 1 is input in step S32. Step S33 determines whether the main device 1 has entered a ready period. If NO is determined in step S33, the operation is shifted to step S34. If YES is determined in step S33, the operation is returned to step S32. The status signal of the main device 1 is input in step S34 and whether the main device 1 has entered a busy period is determined in step S35. If YES is determined in step S35, the operation is returned to step S34, but if NO is determined in step S35, the operation is shifted to step S36. As the predetermined data are input or output, the operation is ended at step S37.

The data input to or output from the main device 1 is started at or near the starting point of the ready period according to the algorithm represented in FIG. 4. In other words, the data input/output is started substantially synchronously with the starting point of the ready period of the main device 1.

The main device in the above prior art example is constructed so that ready periods and busy periods are taken at a certain repetitive ratio. This is a drawback in that, when the data input/output is not completed within the ready period, interference is generated in the busy period. Even if a main device is prepared in which data input/output is always enabled, its function cannot be utilized unless the algorithm in FIG. 4 is modified. Therefore, another drawback arises in which data input/output speed cannot be improved.

DISCLOSURE OF THE INVENTION

The object of this invention is to eliminate the above-described drawbacks and, more particularly, to provide a pseudo-status signal generator which can improve data input/output speed without adding particular modifications to the input/output requesting device 2.

BEST MODE FOR CARRYING OUT THE INVENTION

Figure 5:
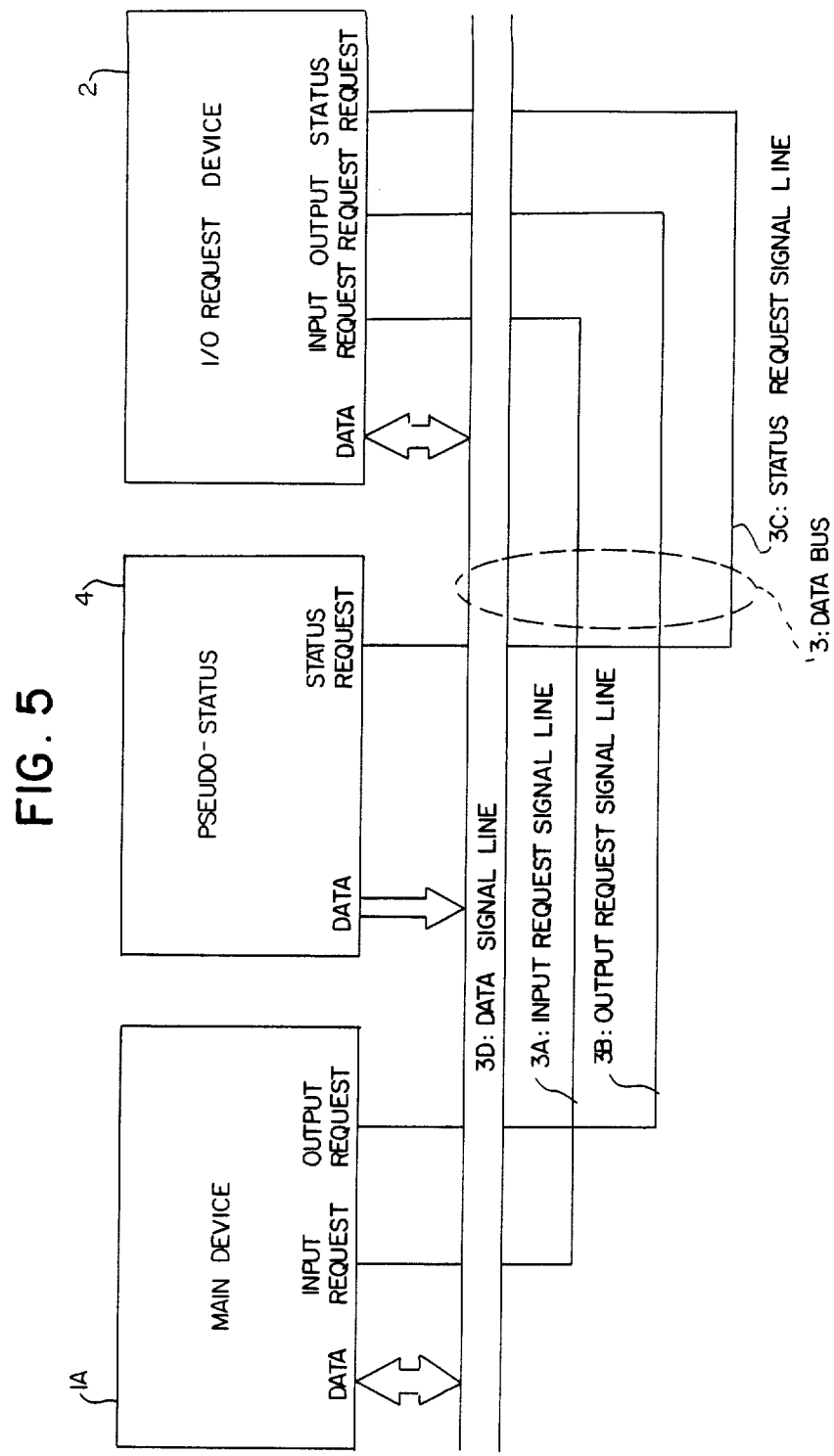
FIG. 5 is a block diagram showing an arrangement of an embodiment of the pseudo-status signal generator of the present invention.

FIG. 5 is a block diagram of an arrangement of an embodiment of an electronic data transfer apparatus including a pseudo-status signal generator according to this invention. In FIG. 5, symbol 1A denotes a main device in which input/output is always enabled, numeral 2 denotes an input/output requesting device, and numeral 4 denotes a pseudo-status signal generator for pseudo-generating status information of the main device 1A. The main device 1A, the input/output requesting device 2, and the pseudo-status signal generator 4 are connected to each other through a data bus 3. An input request signal line 3A and an output request signal line 3B of the data bus 3 connect the main device 1A and the input/output requesting device 2 to each other, and a status request signal line 3C connects the pseudo-status signal generator 4 and the input/output requesting device 2 to each other. Data signal line 3D connects the main device 1A to the pseudo-status signal generator 4 and the input/output requesting device 2. In this embodiment, the pseudo-status signal generator 4 alternately generates status information of ready and busy when status information is requested from the input/output requesting device 2. In other words, if the ready status information is output at a certain time, busy status information is output to a subsequent request for status information.

Figure 1:
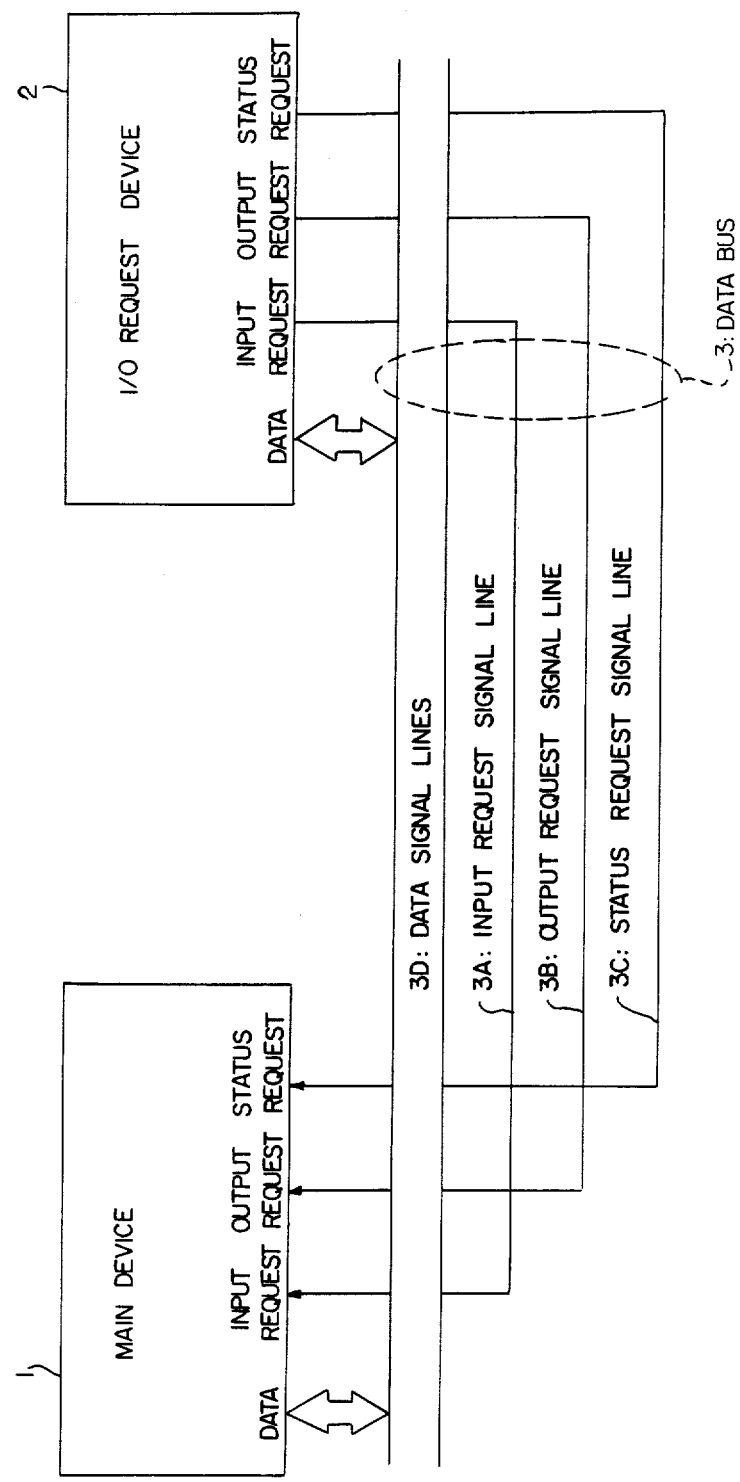
FIG. 1 is a block diagram showing an arrangement of a prior art example.
Figure 2:
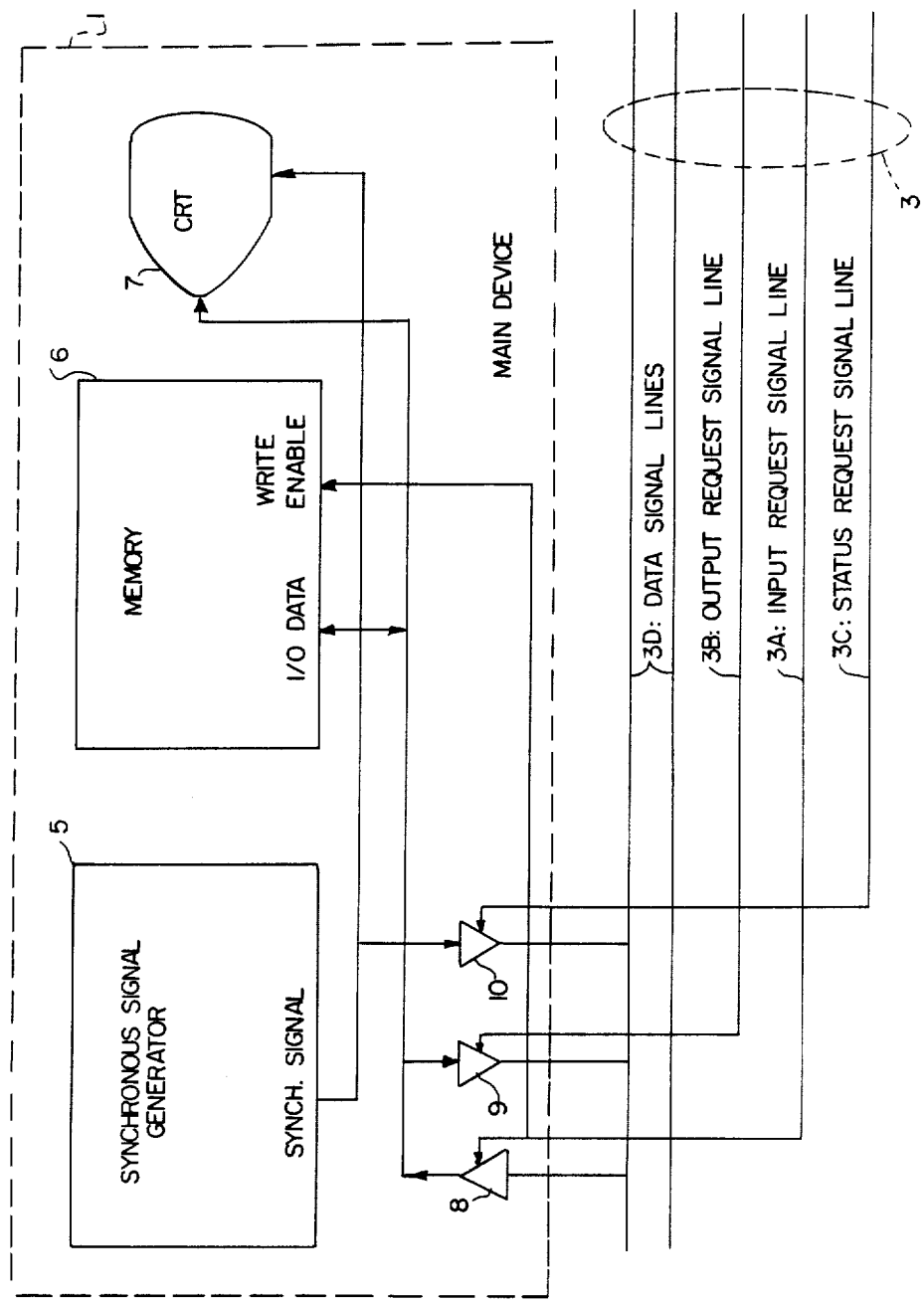
FIG. 2 is a detailed diagram of the CRT main device illustrated in FIG. 1.
Figure 3:
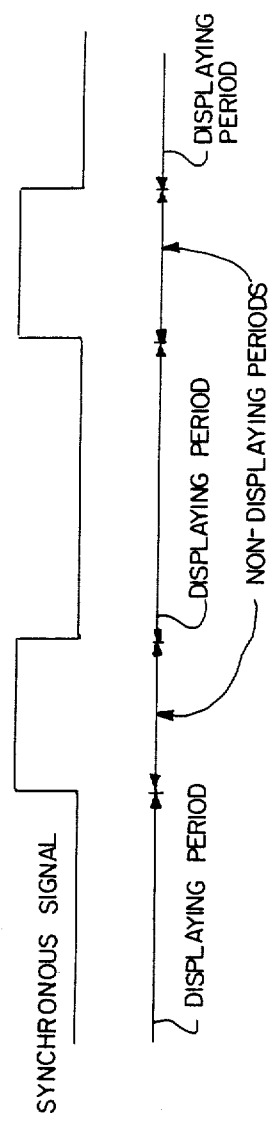
FIG. 3 is a time chart of a synchronous signal.
Figure 6:
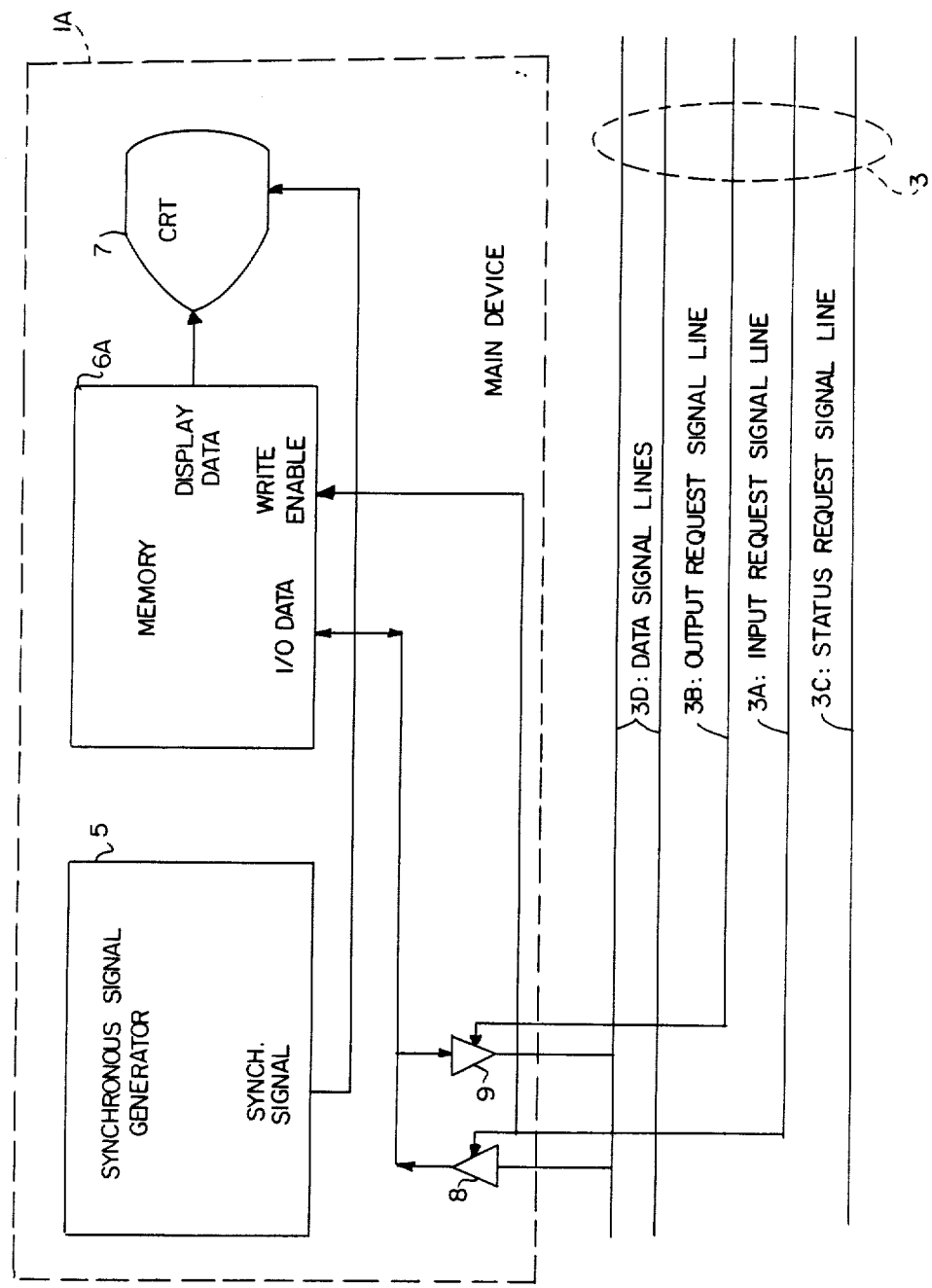
FIG. 6 is a detailed diagram of the CRT main device illustrated in FIG. 5.

FIG. 6 is a detailed diagram of the CRT main device 1A of the present invention. As can be seen, the main device in FIG. 6 differs from the main device in FIG. 2 primarily in the memory and in the manner in which data are transferred within the device. Memory 6A is a two-port type RAM providing independent read/write and data display operations. The advantage is that the display of the CRT is not disturbed even when the read/write operation is carried out during the CRT display.

Figure 4:
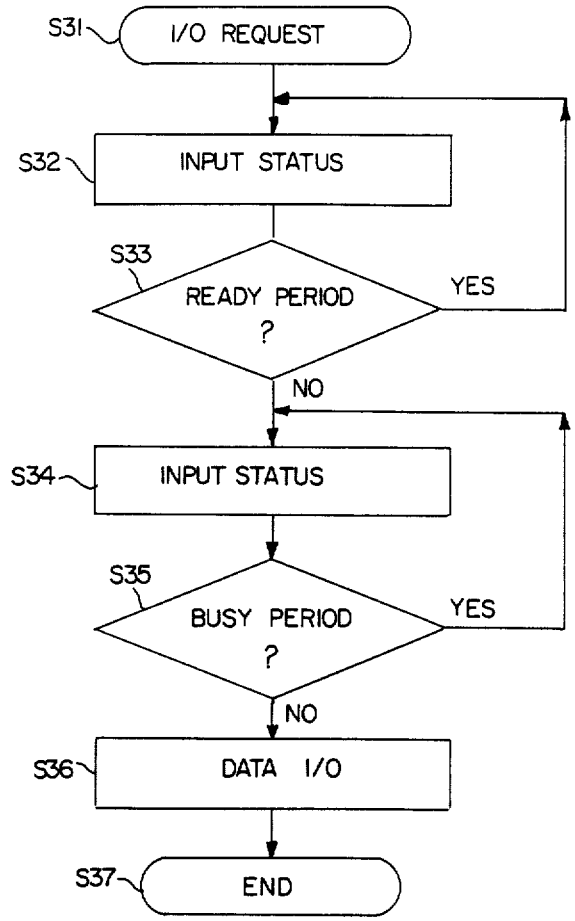
FIG. 4 is a flow chart of an algorithm generally used for data input/output requests.

According to FIG. 6, when the input/output requesting device 2 operates to input or output data to or from the main device 1A, the input/output requesting device 2 requests status information from the pseudo-status signal generator 4 through the status request signal line 3C and receives the status response through the data signal line 3D. If a busy status is output immediately after the previous status request, a ready status is output in the subsequent status request. Therefore, the operation does not enter into the loop from stop S135 to S134 in the flow chart of FIG. 4, and the data input or output operation is accelerated by the length of time that status in a prior art system would have remained busy.

In the embodiment described above, the pseudostatus signal generator 4 is provided as an independent piece of hardware. However, this invention is not limited to this particular embodiment. For example, the pseudo-status signal generator may be associated in the main device 1A or the input/output requesting device 2 if functional independence is maintained, thereby providing similar advantages to those set forth in the preferred embodiment.

As described above, the pseudo-status signal generator 4 of this invention is interposed between the main device 1A in which the ready state is always set and the input/output requesting device 2 for producing the predetermined input/output request to the main device and alternately repeating the status signals representing the ready state and the busy state to the input/output requesting device 2 whenever the status request signal is output from the input/output requesting device 2. Therefore, the data input/output operation can be accelerated without need for any particular modification in the input/output requesting device.

I claim:

1. An electronic data transfer apparatus comprising:
    a main device in which a ready state is always maintained connected to input and output data;
    an input/output requesting device connected to said main device and controlling data input and output operations;
    a data bus provided between said main device and said input/output requesting device to establish connection therebetween and transfer data; and
    a pseudo-status signal generator interposed between said main device and said input/output requesting device and generating status signals representing ready and busy states of said main device in response to a status request from said input/output requesting device.

2. A electronic data transfer apparatus according to claim 1 wherein said main device includes a CRT displaying data and a two-port type memory independently transmitting data to be displayed on said CRT and inputting/outputting data to and from said input/output requesting device.

3. An electronic data transfer apparatus according to claim 2 wherein said CRT is directly connected to one of the two ports of said memory to display data without being disturbed even when read/write operations are simultaneously carried out.

* * * * *